United States Patent [19]

Diaz et al.

[11] 3,806,916

[45] Apr. 23, 1974

[54] ANALOG DATA ACQUISITION SYSTEM

[75] Inventors: Ricardo A. Diaz, Pittsburgh; Andras I. Szabo, Export; Kenneth E. Daggett, Monroeville, all of Pa.

[73] Assignee: Westinghouse Electric Corporation, Pittsburgh, Pa.

[22] Filed: Oct. 6, 1972

[21] Appl. No.: 295,792

[52] U.S. Cl. .......................................... 340/347 NT
[51] Int. Cl. .......................................... H03k 13/02
[58] Field of Search ...................... 340/347 NT, 347; 179/15 AP

[56] References Cited

UNITED STATES PATENTS

| | | | |
|---|---|---|---|
| 2,941,196 | 6/1960 | Raynsford et al. | 340/347 AD |
| 3,493,731 | 2/1970 | Lemonde | 340/347 AD |
| 3,145,374 | 8/1964 | Benner et al. | 340/347 |
| 3,034,101 | 5/1962 | Loewe | 340/347 |
| 3,449,725 | 6/1969 | Eckelkamp et al. | 340/347 |

*Primary Examiner*—Paul J. Henon
*Assistant Examiner*—Leo H. Boudreau
*Attorney, Agent, or Firm*—E. F. Possessky

[57] ABSTRACT

A system is disclosed for accessing selectively data at a plurality of points and applying data from a selected point to a suitable utilization device such as a computer or a computer-like device. In particular, the subject system maximizes the number of points from which data can be gathered by priming the various system components for a subsequent step of acquiring data from a second point while the system is still processing the data from the first point. This system incorporates an integration-type analog-to-digital converter whereby a selected analog signal derived from one of the plurality of points is integrated first over a fixed period of time to obtain a signal of an amplitude with respect to a predetermined level, related to that of the input analog signal, and secondly, applying a known reference signal to the integration circuit and continuing to integrate until the output reaches the predetermined level. During the second integration step, clock pulses are generated whose number is indicative of the amplitude of the input analog signal. A counting device is utilized to count the number of pulses and to convert the total number into a suitable binary signal. In a noisy, industrial environment, it is desirable to use electromechanical switches, such as reed switches, which require a discrete length of time to open and to close. Upon receipt of a signal indicating that the utilization device is ready to receive data from a selected output point, the reed switch corresponding to the desired point from which the input analog signal is to be derived, is actuated and the input analog signal is converted into a corresponding binary representation to be stored in a suitable memory device. Upon further command of the utilization device, the stored binary data is read out and applied thereto. Significantly, the system of this invention initiates the opening of the switch actuated during the acquisition of the input analog signal from the first point, at the end of the first integration process. Further, during the second integration process, the next point is selected by the utilization device and its corresponding switch is closed to prime the system to process immediately the input analog signal from the second point, once the processing of the first input analog signal, i.e., converting the analog signal from the first point into a corresponding binary representation, has been completed. The system of this invention is responsive to the condition in which the analog input signal is of an amplitude larger than the capability of this system and produces a coded signal recognized by the utilization device indicative of such condition. In a similar fashion, the subject system can recognize when more than one electromechanical device is closed to provide a coded output signal indicative thereof. A further significant feature of this invention involves the use of a maintenance module which is adapted to calibrate not only the analog-to-digital conversion circuit of this system, but also the various measuring or sensing devices disposed to obtain the input analog signals. During such calibration, the electromechanical devices are disabled and a suitable, coded output signal is derived from the system indicative thereof.

21 Claims, 33 Drawing Figures

ANALOG DATA ACQUISITION SYSTEM

CROSS-REFERENCE TO RELATED APPLICATION

Reference is made to a concurrently filed and related patent application which is assigned to the present assignee: U.S. Ser. No. 295,616, filed Oct. 6, 1972, entitled "Common Mode Noise Conditioning Circuit," filed in the names of Andras I. Szabo and Ricardo A. Diaz.

BACKGROUND OF THE INVENTION

1. Field of the Invention

This invention relates to analog data acquisition systems and in particular to those systems adapted for use with computers or computer-like devices and capable of accessing and acquiring data rapidly from a plurality of points.

2. Description of the Prior Art

Analog data acquisition systems are used in many industrial applications, such as process control, supervisory instrumentation, data logging, automatic testing, etc. Basically, the function of such systems is to access selectively a plurality of points at which data appear and to apply data derived from one of the plurality of points to a suitable utilization device such as a computer or a computer-like device. The main components of such analog data acquisition systems are the multiplexer, the analog-to-digital (A/D) converter, the digital interface circuitry and the associated control circuitry. The basic function of the multiplexer is to select one of the plurality of points from which the analog data is to be acquired and to connect that one point in turn to the A/D converter, whereby a digital representation of the input analog signal may be obtained. The multiplexer can be constructed from electromechanical switching devices such as reed relays, or from solid state switching devices such as field effect transistors. However, in certain industrial environments where there is a significant presence of high electrical noise and interference, it is desirable to use electromechanical switching devices which do not exhibit the sensitivity of semiconductor devices to such noise. However, such electromechanical devices are not as fast-operating as semiconductor switching devices and require a relatively significant opening and closing interval as compared with solid state devices. For example, a suitable reed switch may require in the order of 3 msec. to open and to close, i.e., a total of 6 msec for the complete operation. It is a significant aspect of this invention that electromechanical switching devices may be used while not permitting the additional opening and closure time required thereby to effect significantly the number of data points that may be multiplexed in a given interval of time.

The A/D converter series to convert input analog data into a corresponding digital representation thereof. Many suitable devices such as a dual slope integration device, a successive approximation device, a ramp A/D converter or even a voltage-to-frequency converter may be used. In those conditions where high noise interference exists, it is desired to use an A/D converter of the integration type to substantially reduce or eliminate the effect of such interference. In many industrial environments, there is noise generated from power lines, i.e., 60-cycle power signals in the United States and 50-cycle power signals in Europe. By integrating such signals over an interval corresponding to the period of such power signals, the resulting extraneous signals therefrom may be substantially eliminated. In particular, the extraneous noise from such sources would appear as a sinusoidal signal of like frequency imposed upon the input analog signal. By integrating the desired analog input signal and extraneous signal over a period equal to a full period of the extraneous signal, the positive and negative portions of the extraneous signal, when summed, will approximately cancel each other out, leaving the desired input analog signal alone to be processed.

The A/D converter may be of the dual slope integration type which integrates an analog input signal to obtain therefrom a number of pulses which may be counted to provide an indication of the amplitude of the input signal. In order to provide a more complete understanding of this invention, a brief explanation of the operation of a dual slope integration type A/D converter will be given. Though such an A/D converter is itself well-known in the art, the subject invention discloses how such an A/D converter may be more efficiently utilized to access analog data from a plurality of points. With reference to FIGS. 4E and 4F of the drawings, a dual slope integration type A/D converter performs a two-step integration process for converting each analog sample into a number of pulses dependent upon the amplitude of the input analog signal. More specifically, the first integration of the analog input signal proceeds for a fixed interval of time, e.g., 1/60 second. At the end of this interval, the input to the integrating circuit of the A/D converter is switched to a known reference voltage. The second integration step continues while a series of clock pulses are generated by a crystal oscillator until the output of the integrating circuit reaches its original level. It is apparent that the time required for the second integration step to be completed and the number of clock pulses generated during this interval, are dependent upon the amplitude of the input analog signal. As indicated in FIG. 4F, the interval of the second integration process does vary and the number of pulses generated by the gated clock during that interval is a representation of the amplitude of the input analog signal.

In the prior art, there are know analog data acquisition systems incorporating such dual slope integration A/D converters. However, the significant problem with such prior art systems is the manner in which the dual slope integration A/D converter is controlled. Typically, in the prior art systems, the multiplexer first is actuated as by the computer device, to close the switch corresponding to the desired point from which analog data is to be accessed. As mentioned above, if the switch is an electromechanical device, a definite time is required to open and then close the switch contacts, as well as to permit resulting transients within the circuit to attenuate. Next, the A/D converter proceeds to perform the first and second integration steps upon the input analog data. After completing both integration steps, the A/D converter then proceeds to open the switch corresponding to the first analog data point and then close the switch of the multiplexer associated with the second analog data point in preparation for A/D conversion of the analog data from the second point. Thus, the second A/D conversion is delayed by the time required to open the first switch and to close the second switch and, in addition, by the time required to generate an appropriate "FLAG" signal to be detected by the computer device and for the computer to respond with a command signal to initiate the analog data acquisition from the second point. As a result, the time required to access and to process data from the second analog data point is unnecessarily delayed and the rate of data acquisition is made unnecessarily slow.

After a data acquisition as described above has been installed, it will be necessary from time to time to make adjustments in the nature of a calibration on the A/D converter to adjust, for example, the reference voltage. Further, it may be desired to check the accuracy of measuring devices or transducers disposed at the analog data points to measure the various conditions upon which data is desired. During such periodic maintenance, it would be desirable if the data acquisition system were not removed from the overall system including the computer device. It may be understood that the computer device may be associated with a plurality of similar data acquisition systems and that it would be desirable if the computer could continue to gather data from the other data acquisition systems, while a system is being calibrated. During such calibration, it would be desirable to inform the computer device that no useful data is being generated, but permit the computer to continue to operate in an otherwise normal manner. Further, when it is desired to calibrate the A/D converter, the switching devices of the multiplexer should be disabled.

Further, interface circuitry is needed between the A/D converter and the device which utilizes the binary data. In the course of the description of this invention, the utilization device referred to is a digital computer; however, it may be understood that a remote terminal control may be connected by the data acquisition system of this invention to a suitable analog subsystem. The proper functioning of the analog subsystem is ensured by the control circuitry. Accuracy, reliability, system flexibility are vitally influenced by the organization and control features of the data acquisition system.

No representation is made that any prior art considered herein is the best pertaining prior art or that the considered prior art can be interpreted differently from the interpretations placed on it herein.

SUMMARY OF THE INVENTION

It is an object of this invention to provide a new and improved data acquisition system capable of accessing and processing more rapidly analog data from a plurality of data gathering points.

It is a more particular object of this invention to provide a new and improved data acquisition system comprising an integration-type A/D converter, wherein the preparatory steps required for selecting a new data point and for priming the data utilization device are commenced during the processing, e.g., A/D conversion, of the presently acquired analog data.

It is a still further object of this invention to provide a new and improved data acquisition system which may be calibrated while the system remains coupled to a suitable utilization device, such as a computer.

These and other objects of this invention are met in accordance with the teachings of this invention by providing a data acquisition system including a multiplexer composed of a plurality of switch devices to be selectively actuated to provide analog data from a plurality of points to a processing circuit including an analog-to-digital (A/D) converter. Illustratively, the A/D converter comprises an integration circuit for converting the input analog data into a corresponding binary representation by a two-step integrating process. First, the input analog data is integrated over a fixed interval, e.g., 1/60 second, and thereafter in the second step, a reference potential of predetermined amplitude is applied to the integration circuit. The second integration step continues while a suitable clock circuit generates at regular intervals a series of pulses, until the output of the integration circuit returns to its original level. It may be understood that the time required for the second integration step to be carried out, as well as the number of pulses generated therein, is dependent upon the amplitude of the input analog signal. In turn, the clock pulses are counted and a representation of the number of pulses is converted into a suitable digital representation of the input analog signal. Illustratively, the digital representation may be stored to be read out upon command of a suitable utilization device such as a computer. It is a significant aspect of this invention that logic and control circuitry is provided for controlling the operation of the multiplexer and the A/D converter so that the step of opening the switching device coupled to the first data acquisition point and closing the switching device corresponding to the second analog data point commences during the processing and in particular the A/D conversion of the input analog signal derived from the first point. Further, the control and logic circuit initiate during the processing of the signal from the first point, the generation of an appropriate signal or signals to be applied to the utilization device to inform that device that the data acquisition system is ready to receive analog data from the next or second point and also that the analog data acquired from the first point is ready to be transmitted thereto.

In an illustrative embodiment of this invention, the A/D converter generates at the end of the first integration step, a signal indicative thereof to be applied to the control and logic circuitry which generates in response thereto a signal to open the contacts of the switching device corresponding to the first analog data point and to provide a signal to the utilization device whereby the utilization device is informed that the multiplexer is now ready to receive an input analog signal from the second point. Now, the utilization device is primed to command the multiplexer to close the switching device corresponding to the second analog data point, whereby the second analog-to-digital conversion may take place.

It is a further aspect of this invention that a calibration or maintenance module may be coupled to the control and logic circuitry referred to above to permit reference voltages to be applied to the A/D converter to ensure the continued accurate operation thereof. During such calibration, the control and logic circuitry generates signals indicating to the utilization device that the multiplexer should not receive further enabling signals and also that the data derived from the data acquisition system is "invalid" and should not be used by the utilization device.

BRIEF DESCRIPTION OF THE DRAWINGS

These and other objects and advantages of the present invention will become more apparent by referring to the following detailed description and accompanying drawings, in which.

DESCRIPTION OF THE PREFERRED EMBODIMENTS

Figure 1:
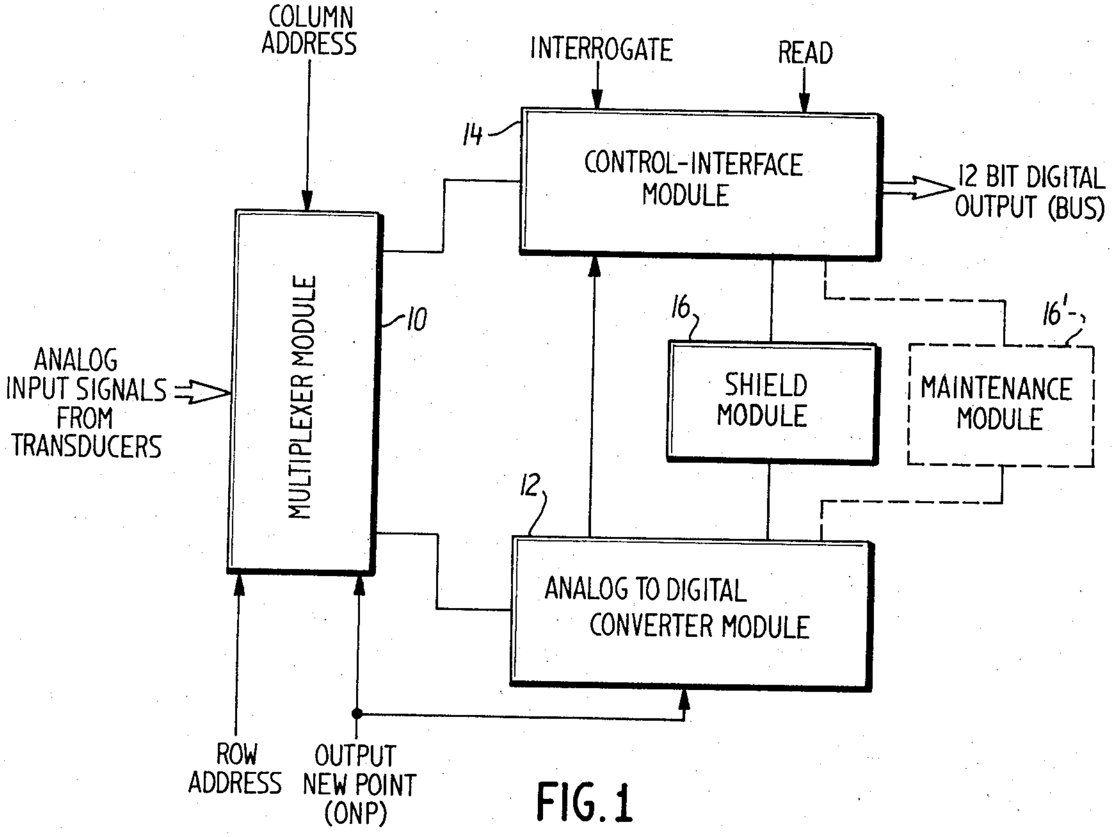
FIG. 1 is a schematic diagram of the overall analog data acquisition system in accordance with teachings of this invention, showing the general functional blocks of the system and the basic system of interconnection therebetween.

With regard to the drawings and in particular to FIG. 1, there is a disclosed an analog data acquisition system in accordance with teachings of this invention, comprising a multiplexer module 10, a shield module 16, an analog-to-digital (A/D) converter module 12 and a control-interface module 14. As will be explained in greater detail, analog input signals as derived from one of a plurality of transducers for sensing and measuring the conditions to be monitored, are available to the multiplexer module 10. The multiplexer 10 is composed of a plurality of switching devices disposed in a matrix comprising columns and rows whereby a selected switch may be activated by suitable address signals derived from a utilization device such as a computer, and applied to the column address and row address of the multiplexer module. Further, the utilization device provides an output new point (ONP) signal indicating that the utilization device is ready for the analog data acquisition system to receive a new sample of data. Upon receipt of the ONP signal, the multiplexer module 10 closes one of the plurality of switching devices to apply the input analog signal to the A/D converter module 12. The A/D converter module 12 converts the input analog signal to a plurality of pulses whose number is indicative of the amplitude of the input analog signal and, in turn, counts the number of pulses to provide a digital representation thereof. In turn, the digital representation derived from the A/D converter module 12 is applied to the control-interface module 14 which stores the digital representation until the utilization device indicates that it is ready to receive the next sample of information. As indicated in FIG. 1, the utilization device applies an interrogating signal to the control-interface module 14, asking module 14 whether data is stored therein ready to be read out. If the data is ready, a suitable DATA READY signal is generated by the control-interface module 14 and applied to the utilization device, which, in response thereto, generates a READ signal to effect a read-out of the stored information in the control-interface module 14. In an illustrative embodiment of this invention, the control-interface module 14 as well as the remainder of the analog data acquisition system is capable of providing a representation of the input analog information in terms of a 12-bit digital output. A shield module 16 is inserted into the analog data acquisition system to enable the normal operation of the system, whereby analog input data is received from a plurality of data sources and is applied to the utilization device upon command. As represented schematically, the shield module 16 is electrically connected to the control-interface module 14 and the analog-to-digital converter module 12 as well as to the multiplexer module 10 to complete various circuits within these modules to ensure the normal operation of the data acquisition system. As will be discussed later, if it is desired to perform a calibration of an integrating circuit incorporated within the analog-to-digital converter module 12, the shield module 16 is removed from the system, and a maintenance module 16' is disposed within the analog data acquisition system. Though not shown in detail, the maintenance module 16' includes reference potential sources against which the various circuits of the analog-to-digital converter module 12 and in particular the integration circuit thereof would be compared for calibration. Further, as will be explained in detail later, the maintenance module 16' sets the A/D converter module 12 and the control-interface module 14 so that the switching devices of the multiplexer module 10 may no longer be actuated by the ONP signal and so that, upon receipt of an interrogation (INT) signal, the control-interface module 14 will not provide a DATA READY signal, but instead will provide an "invalid" signal to the utilization device. The utilization device is set to recognize such an invalid signal, and will continue to operate in a normal manner with respect to the other analog data acquisition systems coupled thereto. Thus, the analog data acquisition system may be calibrated, while still coupled to the utilization device, while permitting the utilization device to continue to operate in a normal fashion.

Figure 2A:
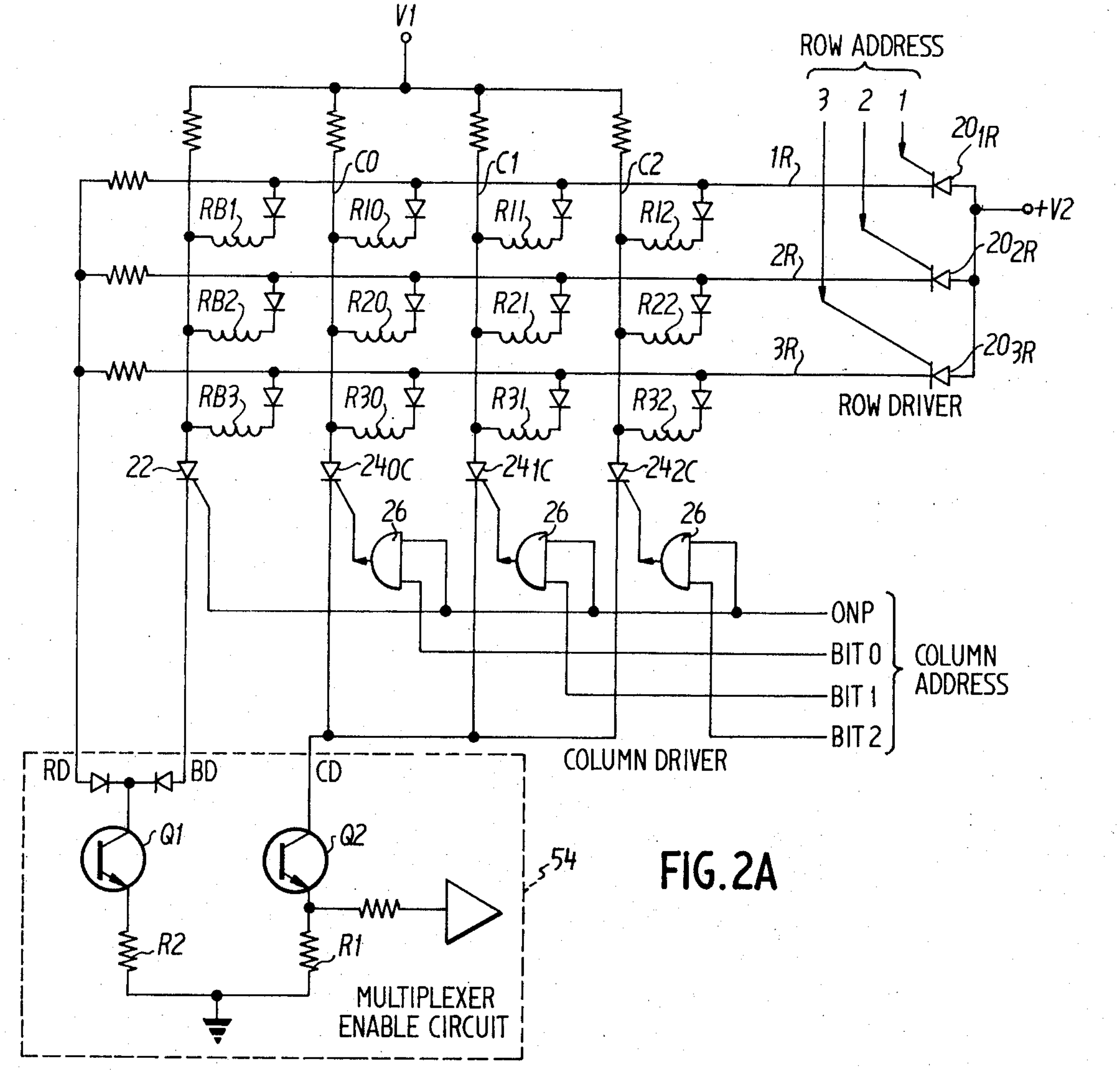
FIGS. 2A and 2B show, respectively, the multiplexer circuits for energizing the switching or relay-type devices in response to addressing signals, and the arrangement of the switching devices for selectively accessing and transmitting data from one of a plurality of analog data points to the analog-to-digital converter module.
Figure 2B:
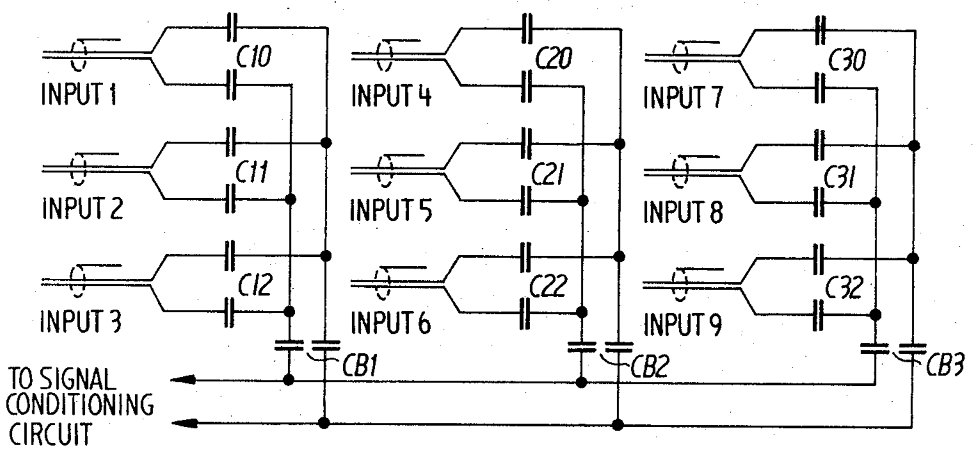

With regard to FIGS. 2A and 2B, there is shown a matrix organized, analog multiplexer scheme which can be driven directly from the computer interface signals which comprise row and column addresses and which are applied to the row address and column address of the energizing circuit of FIG. 2A. For the sake of clarity, only a 9-input multiplexer is described; however, it is understood that in most applications of this invention, a considerably greater number of inputs would be accessed. As shown in FIG. 2A, a plurality of exciting relay coils R10 to R32 is disposed in rows and columns and each is connected at one terminal by a column conductor, and at the other terminal by a diode connected in turn to a row conductor. Each of the row conductors is connected to a suitable switching device such as a silicon control rectifier 20; the subscript of the numeral 20 indicates to which row the SCR is connected. For example, SCR $\mathbf{20}_{1R}$ is connected to the first row conductor 1R. In a similar fashion, the column conductors are connected to suitable switching devices such as silicon control rectifiers (SCR) 24; the subfixes indicate to which of the column conductors the SCR is connected. Thus, each of the exciting coils for the relays R10 to R32 is connected in a matrix fashion and may be energized by actuating its corresponding row and column SCR. For example, if it is desired to energize the exciting coil of relay R11, it is necessary to actuate SCR $\mathbf{20}_{1R}$ and SCR $\mathbf{24}_{1C}$, and at the same time to actuate transistors Q1 and Q2, as will be explained later with regard to FIG. 9. The transistors Q1 and Q2 are a part of a multiplexer enable circuit 54, only a portion of which is shown in FIG. 2A. Thus, when SCR $\mathbf{20}_{1R}$ and SCR $\mathbf{24}_{1C}$ and the transistors Q1 and Q2 are energized, the voltage $+V_2$ is applied to energize the exciting coil R11 associated with the relay through the completed circuit including the row conductor 1R, the column conductor 1C and the transistor Q2 to ground. As mentioned above, the address signals are supplied from the utilization device.

With regard to FIG. 2B, there is shown a plurality of switch contacts C10 to C32, each corresponding to one of the exciting coils R10 to R32, as shown in FIG. 2A. Thus, as described above, if the exciting coil R11 is energized, the contacts C11 will be closed. As illustratively shown in FIG. 2B, a group of contacts C10, C11 and C12 are connected in parallel with each other and further are connected by bus relay contacts CB1 to the buses connected to a signal conditioning circuit 28 incorporated within the analog-to-digital module 12. In a similar fashion, the input relay contacts C20, C21 and C22 are connected in parallel with the bus relay contacts CB2, and the input relay contacts C30, C31 and C32 are connected in parallel with the bus contacts CB3. Though each of the input relay contacts C10 to C32 could be connected in parallel to the signal conditioning circuit 26 without the incorporation of the bus relay contacts, it is desirable to use the bus relay contacts to isolate those portions of the input circuit which have not been actuated from the selected input analog data signal, to minimize the interference as well as the stray capacitance that may be picked up by the remaining portion of the input circuit.

With reference to FIG. 2A, the bus relay contacts CB1, CB2 and CB3 are closed by the exciting bus coils RB1, RB2 and RB3, respectively. In order to energize the exciting coils associated with the SCR's $\mathbf{24}_{0C}$, $\mathbf{24}_{1C}$ and $\mathbf{24}_{2C}$, as well as the SCR 22 associated with each of the bus exciting coils RB1, RB2 and RB3, and ONP signal is derived from the utilization device and is applied to enable each of a plurality of AND gates 28 and directly, to actuate the SCR 22. When one of the column addresses B0, B1 or B2 is present, the corresponding AND gate 26 and its corresponding SCR 24 will be actuated to close the contacts of the corresponding relay. In the example given above, when the address signals and the ONP signal are applied, sampled data from input 2 is applied through the closed contacts C11 and the closed contacts CB1 to the signal conditioning circuit 28. The interrupting of the SCR's holding current is performed by the transistors Q1 and Q2 in a manner to be explained with regard to FIG. 9. When transistors Q1 and Q2 are turned off, the SCR's of the circuit shown in FIG. 2A are turned off, releasing the relay contacts shown in FIG. 2B.

Figure 3:
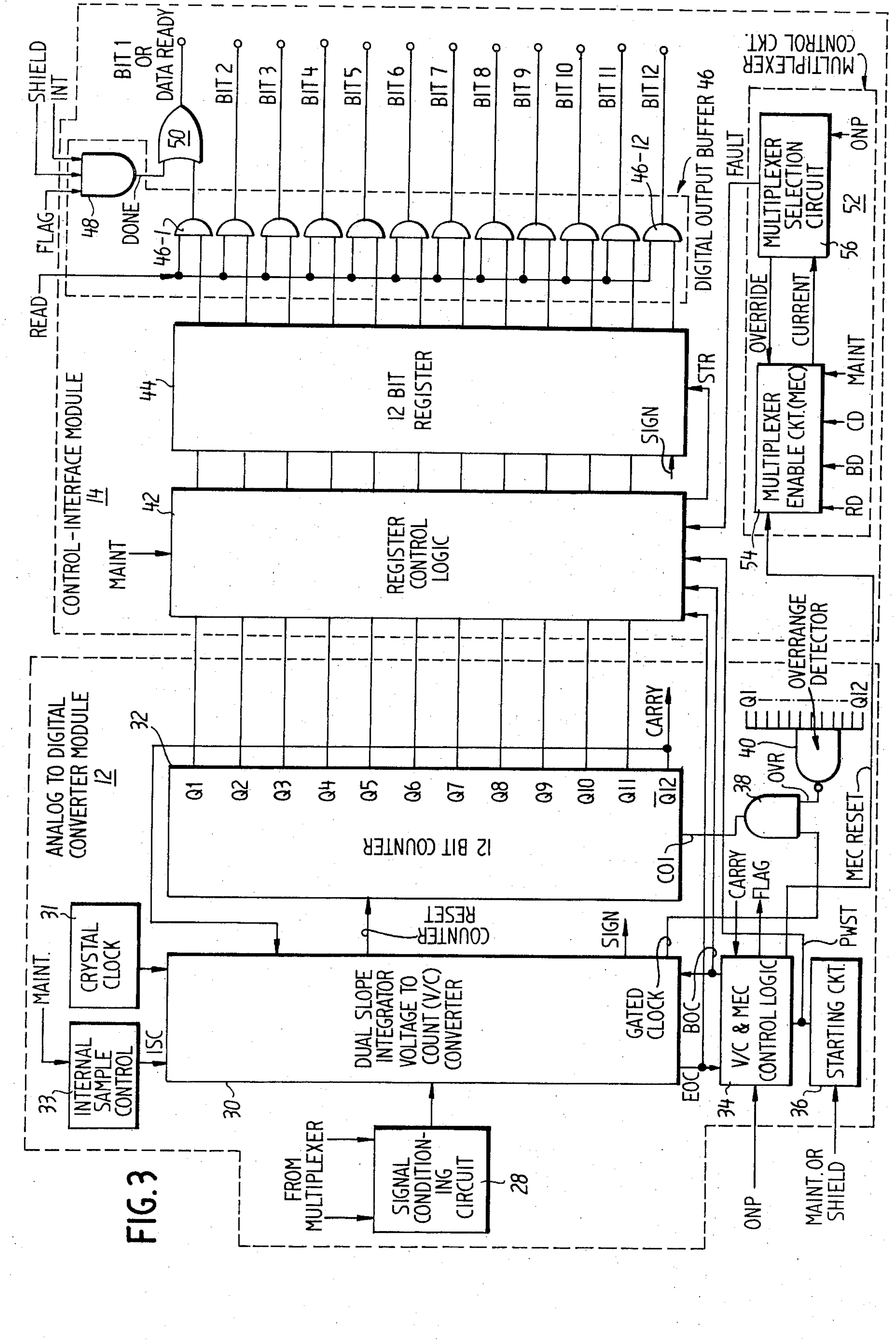
FIG. 3 is a more detailed schematic diagram of the analog-to-digital converter module and the control interface module and their interconnection, as shown in FIG. 1.

With regard to FIG. 3, there is shown in this functional block diagram a more detailed description of the A/D converter module 12 and the control-interface module 14, as well as the application of the input signals derived from the utilization device and the multiplexer module 10 and the various connections between the modules. In particular, the input analog signal derived by actuating one of the relay switching devices of the multiplexer module 10, is applied to the A/D converter module 12 and in particular to the signal conditioning circuit 28. As explained in the above-referenced co-pending application, entitled "Common Mode Noise Conditioning Circuits," the common mode noise and interference may be reduced substantially, if not eliminated, by the circuit 28. In turn, the input analog signal is applied to the A/D converter which converts the selected analog input signal into a parallel binary word. In an illustrative embodiment of this invention, the A/D converter is of the dual slope integrating type, due to its high noise rejection capability and low cost. As illustrated in FIG. 3, the A/D converter is comprised of a dual slope integrator, voltage-to-voltage (V/C) converter 30 for generating a series of output signals whose number is proportional to the amplitude of the input analog data, and a counter 32 for counting and providing a parallel binary representation of the number of pulses and therefore the amplitude of the input analog data signal. A suitable clock circuit such as a crystal oscillator 31 is connected to the V/C converter 30 to provide the source of the pulse signals. In an illustrative embodiment of this invention, the V/C converter 30 may be of the type, model AN2317, as manufactured by the Analogic Company.

Figures 4A, 4B, 4C, 4D, 4E, 4F, 4G, 4H, 4I, 4J, 4K, 4M, 4N:
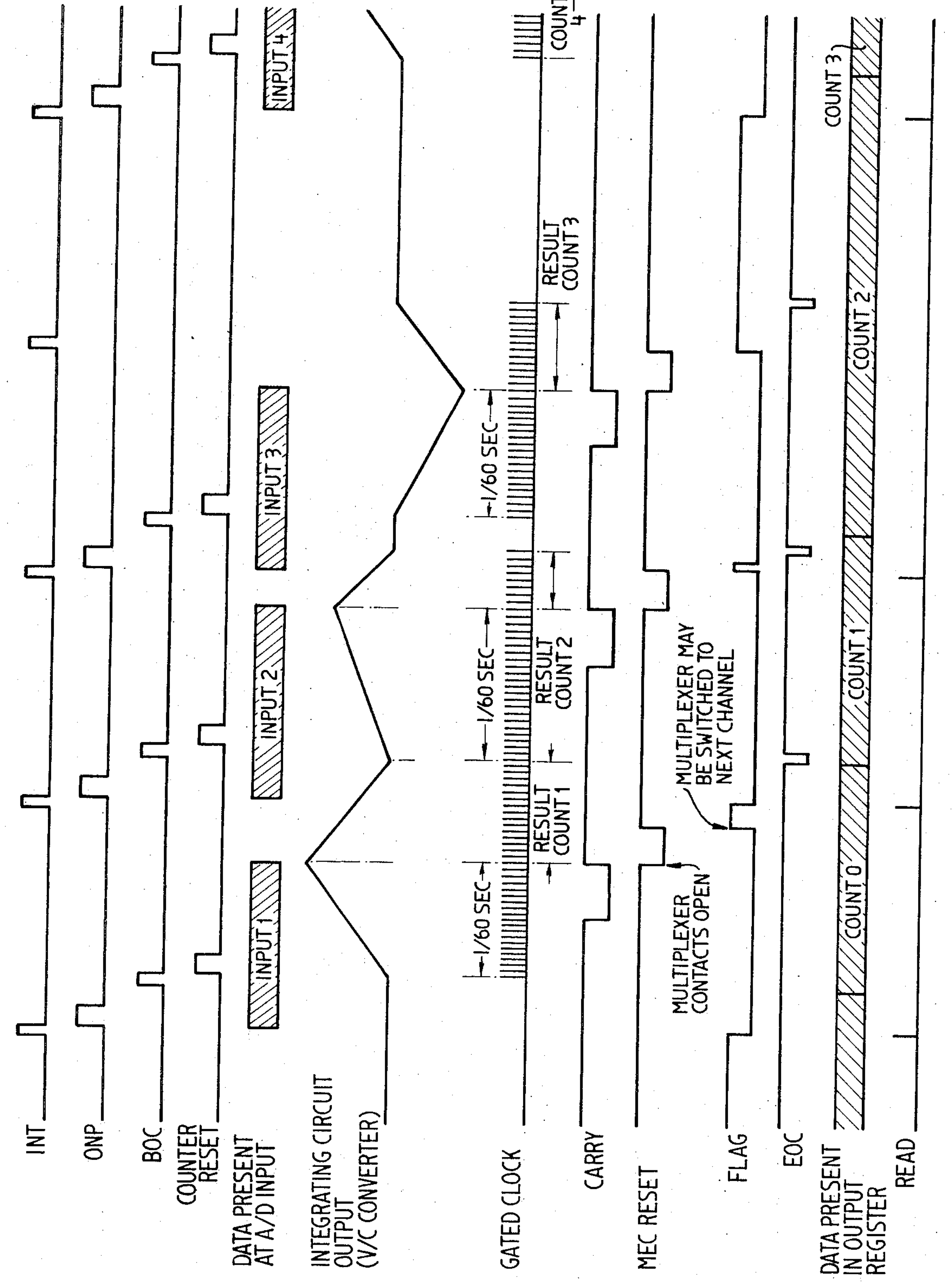
FIGS. 4A to 4K are graphical representations of the various signals applied to and developed by the analog-to-digital converter module and the control interface module shown in FIG. 3.

In operation, the V/C converter 30 includes an integrating circuit (not separately shown) which first is connected to receive an analog input data signal for integrating this input signal over a predetermined interval of time, e.g., 1/60 second, corresponding to the period of the interference. As indicated in FIG. 4E, the output of the integrating circuit rises from an initial or reference level to an amplitude indicative of the amplitude of the input analog data signal. Thereafter, the integrating circuit is switched to a known reference potential as developed by the V/C converter 30 and a second integration process is completed when the output of the V/C converter integrator circuit returns to the original or reference level. The number of clock pulses generated by the clock 31 during the second integration process provides a measure of the amplitude of the input analog data signal and is applied to the 12-bit counter 32 for providing a parallel, digital representation of the amplitude of the input analog data signal. As indicated in FIG. 4F, the series of clock pulses are gated off when the integrating circuit output reaches its original level to provide the RESULT COUNT as indicated between the arrows in FIG. 4F and applied as the "gated clock"

signal through an enabled AND gate 38 to the 12-bit register 32.

Figures 5, 10:
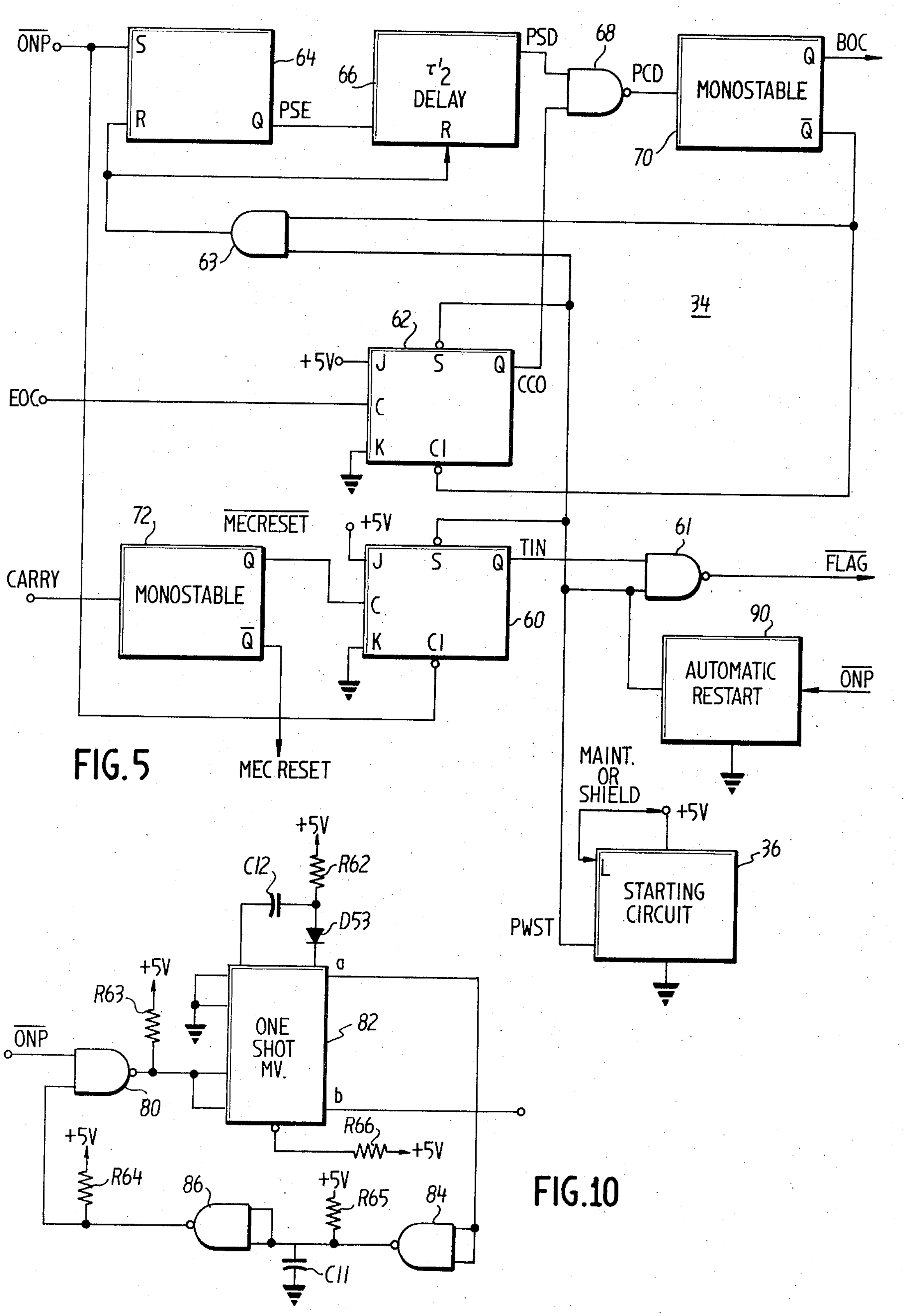
FIG. 5 is a schematic diagram of the voltage to count and multiplexer enable circuit control logic circuit as incorporated into the analog-to-digital converter module shown in FIG. 3.
FIG. 10 is a detailed schematic drawing of an automatic re-start circuit as incorporated into the voltage-to-count and multiplexer enable circuit control logic circuits shown in FIG. 5.

To initiate the operation of the analog data acquisition system, the utilization device such as a computer applies the ONP signal (see FIG. 4A) to a voltage-to-count (V/C) and multiplexer enable circuit (MEC) control logic circuit 34, which operates in a manner to be described with respect to FIGS. 5 and 6 to generate a beginning of conversion (BOC) pulse to be applied to the V/C converter 30. As explained above, the ONP signal also permits the contact of the selected switching device of the multiplexer module 10 to be closed. In response to the BOC signal generated by the V/C and MEC control logic circuit 34, the V/C converter 30 generates and applies a COUNTER RESET pulse as shown in FIG. 4B, to the 12-bit counter 32, which is reset thereby to begin a new counting operation. The train of clock pulses (see FIG. 4F) derived from the gated clock output of the V/C converter 30 is gated into the 12-bit counter 32 simultaneously with the beginning of the integration of the sampled input analog data signal. As described above, the input analog data signal is integrated over a predetermined interval until the counter 32 is filled, i.e., the number of clock pulses has reached the capacity of the counter 32, and a full-scale count CARRY signal is generated, as shown in FIG. 4G, at the $\overline{Q12}$ terminal of the counter 32, and is applied to the V/C converter 30 to initiate the second integration process. In particular, the V/C converter 30 is responsive to the low-to-high rise of the CARRY signal to terminate the first integration process and to apply a reference voltage of opposite polarity to that of the input analog data signal, to the input of the integrator circuit incorporated within the V/C converter circuit 30. As indicated in FIG. 4E, a negative as well as a positive reference voltage are provided within the V/C converter 30 to drive the integrator negatively and positively, respectively, toward the original or reference level. The second integration step continues, as explained above, until the integrating circuit output reaches its original or reference level; at this point in time, the V/C converter 30 generates an end-of-conversion (EOC) pulse to be applied to the V/C and MEC control logic circuit 34, as well as to a register control logic circuit 42. Between the rise of the CARRY signal as seen in FIG. 4G and the occurrence of the BOC signal as seen in FIG. 4B, the counter 32 counts the number of pulses gated from the V/C converter 30 during the second integration step to thereby provide a parallel, binary representation of the amplitude of the input analog data input signal; the binary representation is applied to the register control logic circuit 42. At the end of the first integration step, a SIGN polarity bit is generated also, at the SIGN output of the V/C converter 30.

It is a significant aspect of this invention that after the completion of the first or "up" integration process, the switching to the next or second analog data point is effected, since the first analog data input signal no longer is required for the "down" integration process. As will be explained in greater detail with regard to FIGS. 5 and 6, the V/C and MEC control logic circuit 34 is responsive to the CARRY signal derived from the counter 32 to generate a MEC (multiplexer enable circuit) RESET signal to initiate the opening of the relay contacts of the multiplexer module 10 associated with the first analog data point and to generate a FLAG signal (see FIG. 4J) by which the utilization device is informed that analog data derived from a new or second data point may be applied now to the analog data acquisition system. In response to the FLAG signal, the utilization device is primed to generate the next ONP signal whereby the relay contacts associated with the next analog data point may be closed. The switching process involves the opening of the relay contacts which are connected to the first or present point to the V/C converter 30, followed by closing the relay contacts associated with the next or second data point.

All data remains in the counter 32 until the next COUNTER RESET pulse (see FIG. 4C) is applied thereto by the V/C converter 30. As indicated in FIGS. 4B and 4C, the V/C converter 30 is responsive to the occurrence of a BOC signal, to generate the next COUNTER RESET signal to reset the counter 32 to zero for the beginning of the next or new conversion. Before the counter 32 is reset, the digital representation of the input analog signal provided by the counter 32 is loaded into a 12-bit register 44 by a BOC pulse applied to the register control circuit 42. As will be more completely described with respect to FIG. 7, the BOC signal sets a plurality of flip-flop devices comprising the register 44. The information stored in the register 44 only can be dispatched to the memory of the computer device during pre-assigned times. In a typical computer, the EXECUTIVE program thereof would determined the priorities for receipt and storage of information. Therefore, until a suitable READ signal is derived from the computer device, the information will be continued to be stored in the register 44.

The utilization device such as a computer interrogates the control-interface module 14 to determined if the analog data has been processed by the A/D converter module 12 and is ready to be applied to the utilization device. If the answer is affirmative a digital output buffer 46 will permit the data stored in the register 44 to be transferred by the bus line comprised of the bit-1 to bit-12 outputs, to the utilization device. In particular, the digital output buffer 46 comprises two parts; a data-status interrogation circuitry and a data gate circuitry. The data-status interrogation circuitry includes an AND gate 48 having inputs to which the FLAG, shield and interrogation (INT) signals are applied. In normal operation, the shield module 16 will be inserted within the data acquisition system as shown in FIG. 1, and the shield signal is a high or 1 signal. As will be explained in detail later, the V/C and MEC control logic circuit 34 generates a high FLAG signal a predetermined interval after the termination of the first integration step or process of the integrating circuit of the V/C converter 30. In order to transfer the data stored upon the register 44, the utilization device interrogates the control-interface module 14 by generating an INT pulse, to be applied to the AND gate 48. If the FLAG signal is high, the AND gate 48 is enabled to generate a high DONE signal; the DONE signal is a pulse of the same duration as the INT signal and is applied through an OR gate 50 to the least significant of the bus lines, i.e., the bit-1 output, which indicates that the DATA is READY for transfer. The DATA READY signal is applied to the computer device which, under the command of its EXECUTIVE program, generates a READ signal (see FIG. 4K) to be applied to the data gate circuitry of the digital output buffer 46. The buffer 46 comprises a plurality of AND gates 46-1 to 46-12 which are enabled by the READ signal to transfer or read out the data stored upon the register 44. After the data has been received, the utilization device in response thereto, generates the next ONP pulse to permit the switching device of the multiplexer module 10 associated with the next point to be accessed, to be closed and to initiate a new sequence of events in the control logic. However, if the FLAG signal is low, indicating that the data is not ready for transfer, the AND gate 48 will not be enabled and a DATA READY signal will not be generated. Further, a new ONP signal will not be generated under such conditions. The occurrence of an INT pulse when the FLAG is down, is illustrated in FIGS. 4I and 4J; under such conditions, no ONP or BOC signal is generated and the data present in the output register 44 corresponding to the previous or second count remains stored in the output register 44.

FIGS. 4D and 4N show the relationship between the time that the input data is applied to the V/C converter 30, and the time that the corresponding digital representation is stored in the output buffer 46. The transfer of data from the register 44 occurs after the beginning of the subsequent A/D conversion of input data. Illustratively, after the input analog data from the second point is connected by the multiplexer module 10 to the A/D converter module 12 and this data has been processed thereby, COUNT 1 then is read from the register 44.

With regard to FIG. 3, a further feature of this invention provides the capability of detecting the condition when the amplitude of the input analog signal is too high as to be over-range or beyond the capability of the system, so that the counter is unable to provide a digital representation thereof. The over-range detector comprises a NAND gate 40 having twelve inputs connected to the outputs Q1 to Q12 of the counter 32. When the inputs to the NAND gate 40 are all high, indicating that the counting capacity of the counter 32 has been reached, the NAND gate 40 generates and OVR (over-range) signal to disable the AND gate 38 and to set the counter 32 in its ALL 1'S state. Such a set of signals will be transferred through the control-interface module 14 to the utilization device, which recognizes this as an "invalid" reading. In particular, the OVR signal is normally high, permitting the gating clock pulses derived from the V/C converter 30 to be applied to the counter 32. When all of the outputs of the counter 32 are 1's, OVR is zero and the output COI (counter input) of the AND gate 38 goes to zero, thereby inhibiting the counter 32.

The shield module 16 or the maintenance module 16' is added to the data acquisition system for noise protection or calibration, respectively. In an illustrative embodiment of this invention, the various modules as shown in FIG. 1 are mounted upon circuit boards; the shield module 16 may take the form of a circuit board disposed between the multiplexer module 10 and the remaining modules of the system to provide a shield to protect the remaining modules from the noise and/or interference generated by the multiplexer module 10. Further, in data acquistion systems, it is important to make periodic calibrations of the A/D converter module 12 to prevent inaccuracy due to aging of the components. Further, this calibration should not interfere with the normal functions of the utilization device. In normal operation, the shield module 16 is inserted within the analog data acquisition system and when it is desired to calibrate, the circuit board containing the shield module is removed and the maintenance (or calibration) module 16' is inserted in its place. When the shield module 16 is removed, the contacts of the switching devices comprising the multiplexer module 10 are disabled and remain disabled during the calibration procedures effected by the maintenance module 16'. As will be explained with regard to FIG. 7, the control-interface module 14 and in particular the register control logic 42, imposes a coded signal upon the outputs bit-1 to bit-12 thereof indicative of an "invalid" reading, e.g., ALL 1'S, such that the utilization device does not attempt to direct further the A/D converter module 12. As indicated in FIG. 3, the maintenance module 16' controls an internal sample control circuit of the V/C converter 30 and provides a reference voltage for calibration of its integration circuit. When the shield module 16 is inserted again to return the data acquisition system to normal operation, the control-interface module 14, as will be explained, forces all 1's into the output register 44, making the first output signal invalid.

Figures 6A, 6B, 6C, 6D, 6E, 6F, 6G, 6H, 6I, 6J, 6K, 6L:
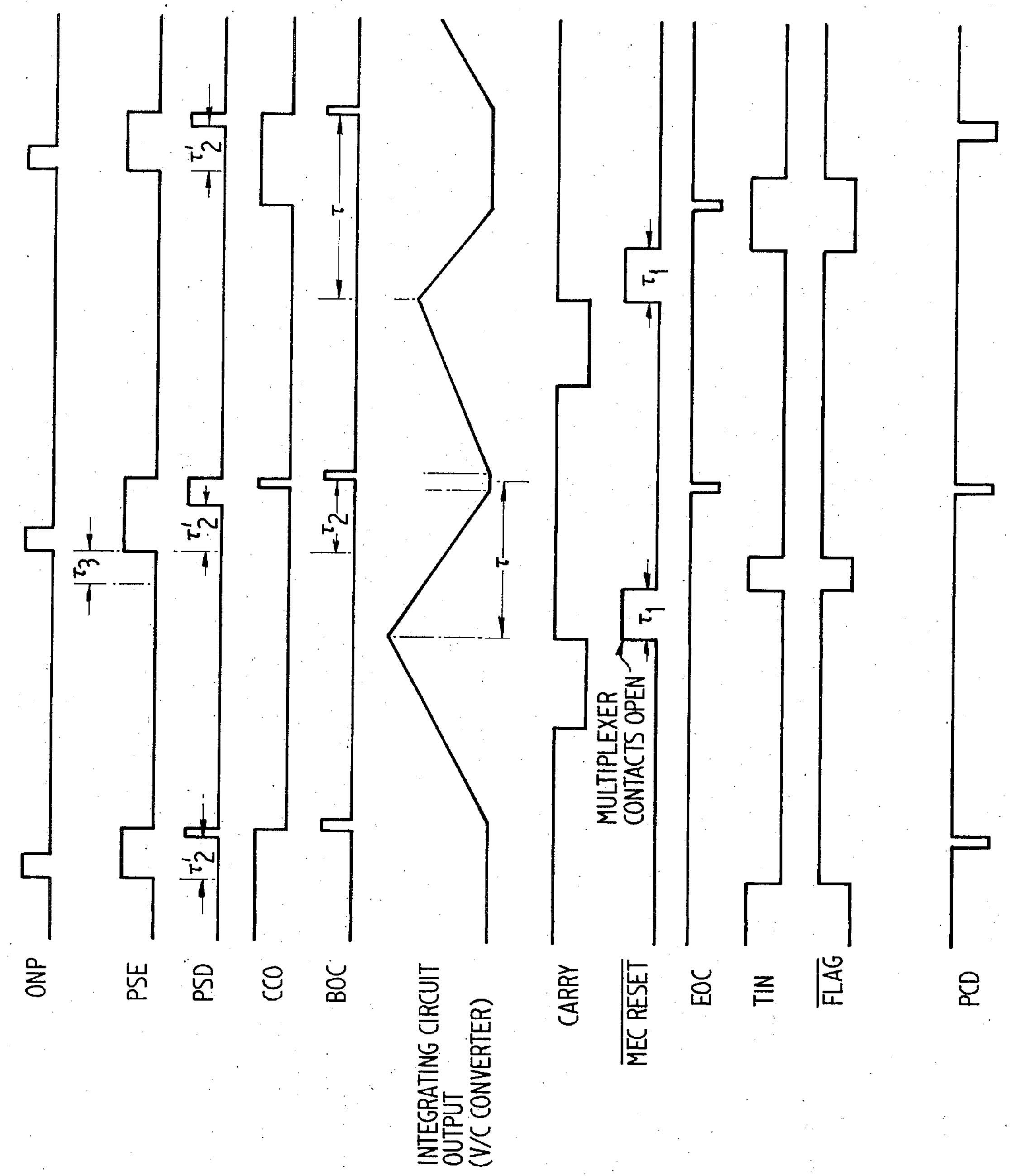
FIGS. 6A to 6L show graphically the various signals applied to and developed by the voltage-to-count and the multiplexer enable circuit control logic circuits shown in FIG. 5.

The operation of the voltage-to-count (V/C) and multiplexer enable circuit (MEC) control logic 34 to synchronize the sequence of the opening and closing of the multiplexer relays in relationship to the operation of the V/C converter 30, now will be explained with regard to FIGS. 5, and 6A to 6K. Initially, when power first is applied to the data acquisition system, a starting circuit 36 provides a delay illustratively of 200 msec before permitting its output signal PWST to go high. The delay provided by the starting circuit 36 is sufficient to permit the stabilization of flip-flops 60, 62 and 64. A more detailed explanation of the starting circuit 36 will be provided with regard to FIG. 8. In particular, the PWST signal is applied to the set terminals of the JK flip-flops 60 and 62 and through enabled AND gate 63 to the reset terminal of flip-flop 64 to enforce their respective output signals TIN and CCO to a 1 state and PSE to a 0 state. The output TIN (see FIG. 6J) of the JK flip-flop 60 is applied to an input terminal of a NAND gate 61 and after the suitable delay provided by the starting circuit 36, the high PWST signal forces the $\overline{\text{FLAG}}$ signal (see FIG. 6K) derived from the NAND gate 61 low. During this initial period, the $\overline{\text{ONP}}$ pulse is disabled. As seen in FIG. 5, the ONP pulse is applied to the set terminal of the flip-flop 64 and also to the clear input terminal of the JK flip-flop 60. Upon the occurrence of the $\overline{\text{ONP}}$ signal as shown in FIG. 6A, its leading, rising edge sets the TIN signal as shown in FIG. 6J to zero, and the PSE signal as seen in FIG. 6B to 1. The PSE signal is applied, in turn, to the input terminal of a delay circuit 66 which provides a delay of $\tau_2'$ between the leading edge of the PSE signal and generating the leading edge of a PSD output signal (see FIG. 6B) therefrom. The delay $\tau_2'$ corresponds to the maximum delay required for the relay or switching devices of the multiplexer module 10 to close and for the resulting transients induced in this system to attenuate.

As explained above with respect to FIG. 3, a CARRY pulse is derived from the counter 32 at the completion of the first or "up" integration and is applied to a monostable circuit 72, as shown in FIG. 5. In particular, the low to high transition of the CARRY signal as shown in FIG. 6G fires the monostable circuit 72 producing its output signal MEC of a predetermined duration $\tau_1$ sufficient to permit the relay contacts of the multiplexer module 10 to open. The MEC reset signal, as dervied from the $\overline{Q}$ terminal of the monostable circuit 72, is applied to a multiplexer control circuit 52 as more fully described with regard to FIG. 9. As seen in FIGS. 6F, 6G and 6H, the end of the first step of integration is indicated by the trailing edge of the CARRY signal which sets the $\overline{MEC}$ reset signal to its high state. The leading edge of the MEC reset signal is used to open the relay contacts of the multiplexer module 10, during the second or down integration carried out by V/C converter 30. The $\overline{MEC}$ reset signal derived from the Q terminal of the monostable circuit 72 is applied to the clock input of the JK flip-flop 60. As seen in FIGS. 6H and 6J, the trailing edge of the $\overline{MEC}$ reset signal sets the JK flip-flop 60 to force its TIN output signal to 1; in turn, the TIN signal actuates the NAND gate 61 to force the $\overline{FLAG}$ signal low. A low $\overline{FLAG}$ signal is indicative that the relay contacts of the multiplexer module 10 associated with the first data point have been opened and that the data acquisition system is ready to access the next or second analog data point. As explained above with regard to FIG. 3, the utilization device generates an INT signal for interrogating the analog data acquisition to determine whether data is ready to be transferred thereto. After the status has been interrogated, an $\overline{ONP}$ pulse is generated and applied to the set terminal of the flip-flop 64 and to the clear terminal of the JK flip-flop 60. The leading edge of the ONP pulse as seen in FIG. 6A forces the TIN signal of the flip-flop 60 to low, thereby resetting the $\overline{FLAG}$ signal to 1.

Upon completion of the second or down integration, the V/C converter 30 as shown in FIG. 3 generates an end of conversion (EOC) pulse as shown in FIG. 6I to be applied to the clock terminal of the JK flip-flop 62, as shown in FIG. 5. The falling edge of the EOC pulse actuates the JK flip-flop 60 to set its CCO signal to 1, as shown in FIG. 6E. As indicated in FIG. 5, the PSD signal dervied from the delay circuit 66, and the CCO signal derived from the JK flip-flop 62 are applied to a NAND gate 68 whose output is connected to the input of a monostable circuit 70. A beginning of conversion pulse (BOC) is generated by the monostable circuit 70 only when the PSD and CCO signals are 1's. In particular, the NAND gate 68 is responsive to the high PSD and CCO signals to set its output signal PCD low, as seen in FIG. 6L. When the PCD signal goes low, the monostable circuit 70 is fired to generate the BOC pulse as seen in FIG. 6E, of predetermined pulse width. Further, the monostable circuit 70 generates from its $\overline{Q}$ terminal a $\overline{BOC}$ signal to be applied to the clear terminal of the JK flip-flop 62, through the AND gate 63 to the reset terminal of the flip-flop 64 and to the reset terminal R of the delay circuit 66. The rising edge of the $\overline{BOC}$ pulse, as seen in FIG. 6E, forces the signal CCO derived from the JK flip-flop 62 to zero, resets the signal PSE derived from the flip-flop 64 to zero, and resets the output of the delay circuit PSD to zero.

There are two possible sequences with regard to the order of occurrence of the ONP signals and the EOC signals:

1. ONP arrives before EOC, as shown at the second occurrence of the ONP signal in FIG. 6A, or
2. ONP arrives after the EOC signal, as shown at the third occurrence of the ONP signal in FIG. 6A.

The total time $\tau$ between the opening of the relay contacts as initiated by the $\overline{MEC}$ reset signal shown in FIG. 6H, and the beginning of the new conversion is given by: $\tau = \tau_1 + \tau_2 + \tau_3$, where $\tau_1$ is the time which elapses between the opening of the relay contacts and the raising of the FLAG signal, $\tau_3$ is the time that the computer takes from the raising of the FLAG signal and the time to raise the ONP signal, and $\tau_2$ is either the time required to complete the down integration or that time $\tau_2'$ required to permit the relay contacts to close and the resulting switching transients to die down on the multiplexer bus, whichever is the greater. Thus, significantly, the V/C and MEC control logic circuitry as shown in FIG. 5, serves to control the A/D converter module 12 and the multiplexer module 10 in a manner such that the end of the first integration process of the V/C converter 30 initiates as by the CARRY signal the opening of the switch contacts associated with the first analog data point. In particular, this delay $\tau_1$ is determined by the monostable circuit 72. Secondly, the closing of the relay contacts associated with the second data point is delayed a period of at least $\tau_2'$ as determined by the delay circuit 66, which period is initiated by the leading edge of the ONP pulse. Upon the occurrence of the trailing edge of the $\overline{MEC}$ reset signal as derived from the monostable circuit 72, the FLAG signal is raised to indicate to the utilization device that the data acquisition system is prepared to receive analog data from the next point. Significantly, the priming of the data acquisition system to receive data from a second analog point begins during the processing of the analog data derived from the first point and, in particular, at the end of the first integration of the D/C converter 30.

Figure 7:
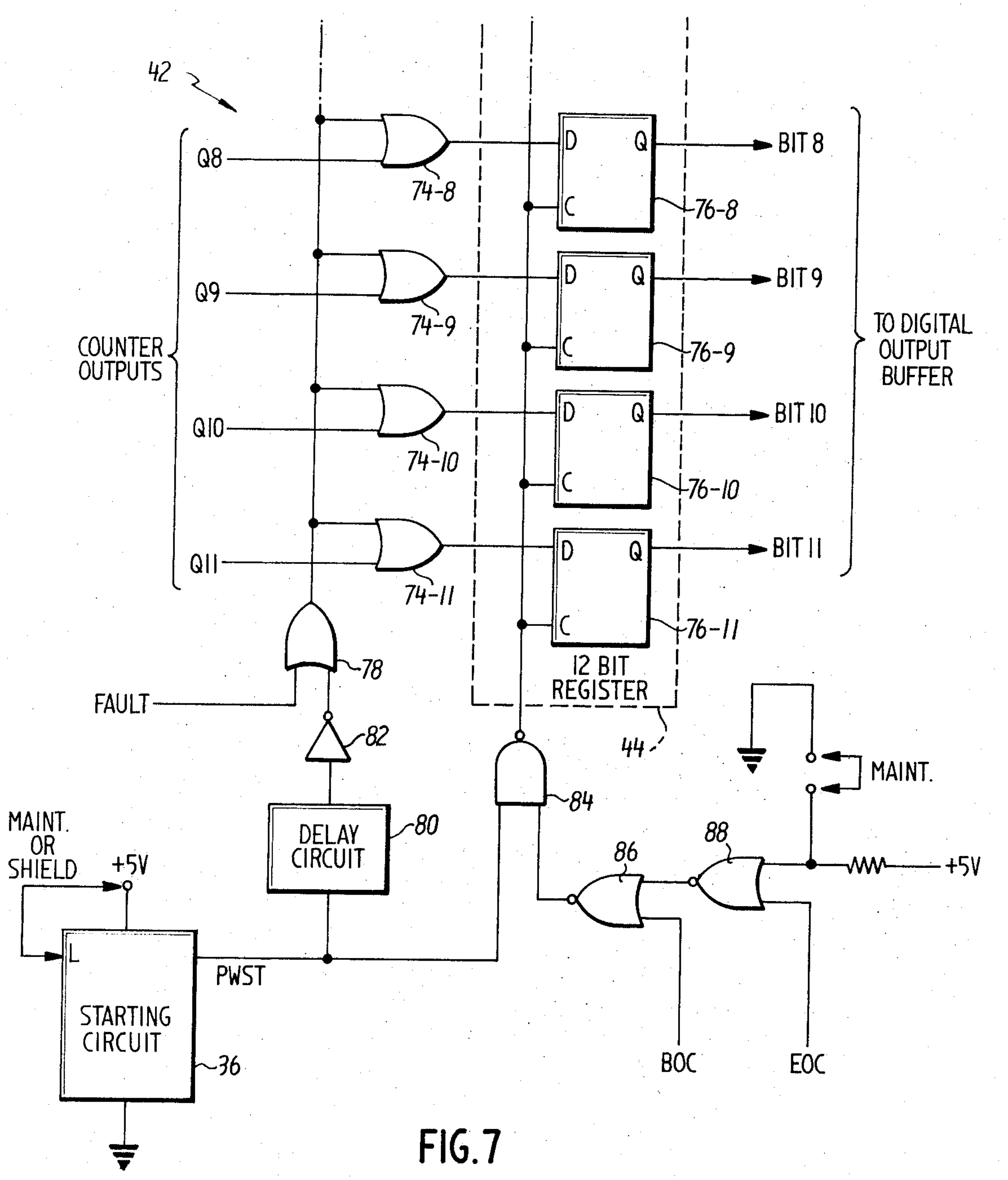
FIG. 7 is a schematic diagram of the register control logic circuit as incorporated within the control interface module shown in FIG. 3.

The register control logic circuit 42, as briefly discussed above with regard to FIG. 3 and as now discussed more fully with regard to FIG. 7, controls the application (or strobing) of data in response to the BOC pulses, to the 12-bit register 44 and also to impose coded signals, as will be explained, upon the register 44. Under normal operating conditions, a +5V signal is applied to disable the NOR gate 88 and prevent the EOC pulses from being applied to the register 44. As illustrated in FIG. 7, the 12-bit register includes a plurality of storage devices 76-1 to 76-11 for receiving and storing the binary representation provided from the counter 32 through the counter outputs Q1 to Q11. In normal operation, the low output derived from the disabled NOR gate 88 enables a NOR gate 86, and upon application of the BOC pulses as shown in FIG. 4B, the NOR gate 86 generates a pulse of duration corresponding to that of the BOC pulse, enabling a NAND gate 84 to strobe the data derived from the counter outputs Q1 to Q11 into the storage devices 76-1 to 76-11. After an initial delay provided by a starting circuit 36, its signal PWST, as applied to the other input of the NAND gate 84, goes high.

Figure 9:
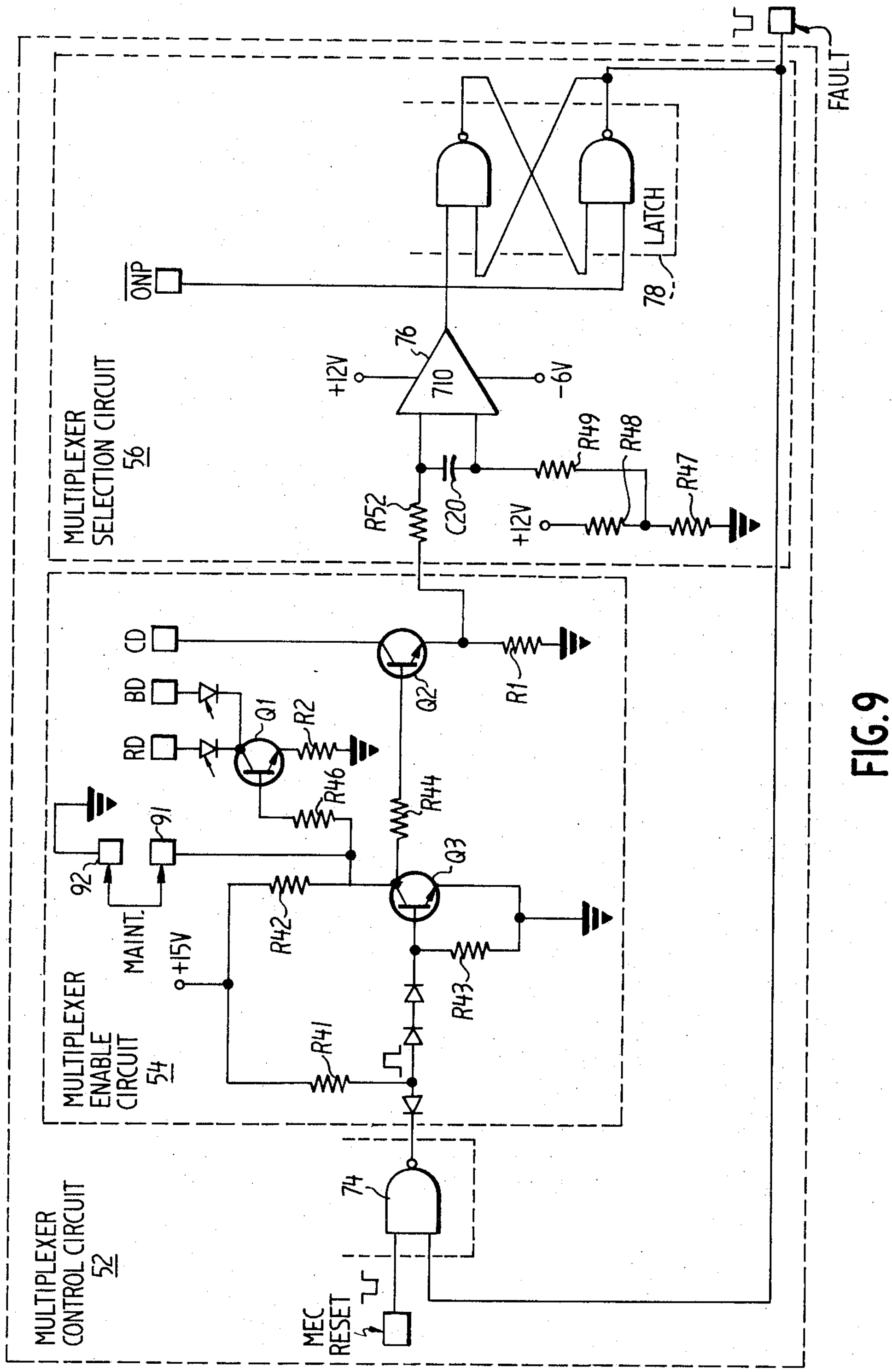
FIG. 9 is a detailed schematic diagram of the multiplexer control logic circuit as incorporated into the control interface module shown in FIG. 3.

If more than one relay contact closes at a time, a false signal is generated by a multiplexer selection circuit 56, as will be more fully described with respect to FIG. 9, to be applied through an OR gate 78 and to each of a plurality of OR gates 74-1 to 74-11 to load all 1 signals into the register 44. The utilization device will interpret these ALL 1's signals as an invalid condition. Each time that either the maintenance or shield modules are inserted into the data acquisition system, the output PWST signal of the starting circuit 36 stays low for a period of time and then goes high. During this period, the PWST signal is delayed by a circuit 80 and inverted by an inverter circuit 82 to apply a positive pulse through the OR gate 78 and the OR gates 74 to load all 1's into the register 44. The delay circuit 80 permits the low PWST signal to enable the AND gate 84 to strobe each of the memory devices 76, before the application of the 1 signals to each of the memory devices 76.

When the maintenance module 16' is inserted into the data acquisition system, a maintenance (MAINT) jumper is disposed to connect one input of the NOR gate 88 to ground, thereby enabling the NOR gate 88 to apply the EOC signals to the output register 44. When the shield module 16 is withdrawn and the maintenance module 16' inserted into the system, the AND gate 48, as shown in FIG. 3, will be disabled and DATA READY signals no longer will be transmitted to the utilization device, and the utilization device no longer will provide either READ signals to the output buffer 46 or ONP signals to the V/C and MEC control logic circuit 34. Thus, during the calibration mode of operation when the maintenance module 16' is inserted into the system, the data stored into the register 44 will not be gated out through the digital output buffer 46 and will not be applied to the utilization device. However, a plurality of suitable indication devices such as lamps are associated with the outputs bit-1 to bit-11 of the register 44, as shown in FIG. 7, to provide a suitable indication of the operation of the converter 30 to the operator carrying out its calibration. For example, an input signal of known amplitude may be applied to the converter 30 and it would be desirable to check the accuracy of the system by energizing a selected number of the lights; in this manner, the operator would know whether the converter 30 has been satisfactorily calibrated. As mentioned above, during the calibration operation, no further ONP signals are applied to the data acquisition system or, in particular, to the V/C and MEC control logic circuit 34. As a result, no corresponding beginning-of-conversion signals are generated by the circuit 34. Thus, in order to load data into the register 44, the EOC signals as continued to be generated by the converter 30 are applied through the NOR gates 88 and 86 and NAND gate 84 to load data resulting from the calibration test into the register 44 and thereby provide an indication thereof to the operator.

Figure 8:
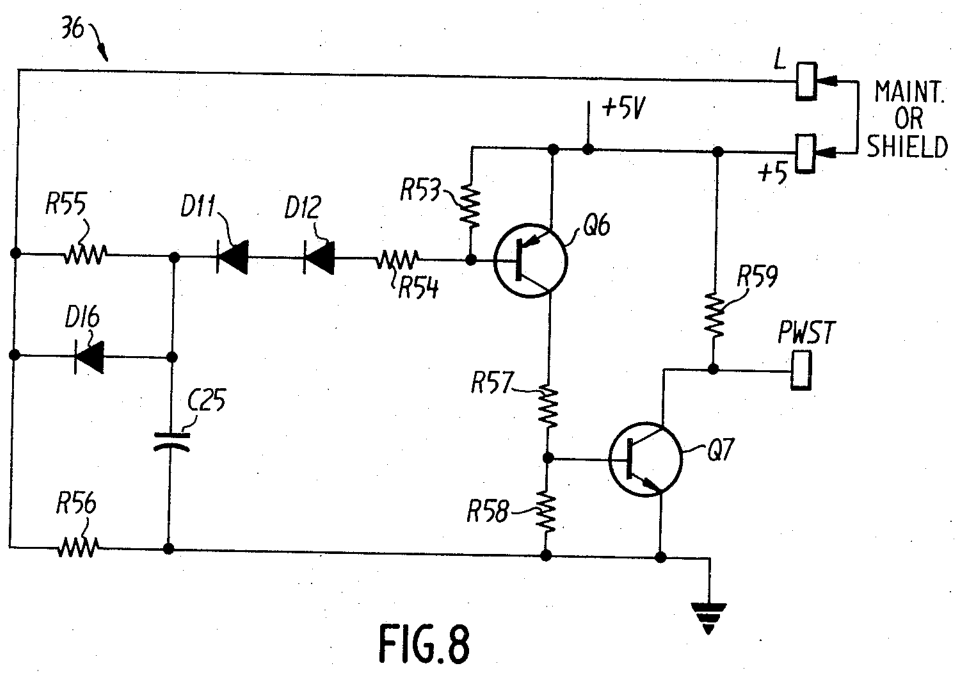
FIG. 8 is a detailed schematic diagram of the starting circuit incorporated in the analog-to-digital converter module as shown in FIG. 3.

The starting circuit 36, as has been discussed previously with regard to FIGS. 5 and 7, now will be more thoroughly described with respect to FIG. 8. Basically, the starting circuit 36 generates the PWST signal which presets the flip-flops 60, 62 and 64, as shown in FIG. 5, thereby inhibiting the generation of a FLAG signal, for a small time delay in order to prevent premature selection of analog data points. The starting circuit 36 is activated when the power is turned on, and also when either the maintenance or shield module is inserted in the system. Initially, when +5V is applied or when the maintenance or shield jumper is inserted, a capacitor 25 is initially discharged and the +5 voltage is applied through terminal L and resistor R55 to initiate the charging of the capacitor C25. Further, before the capacitor C25 has become charged, the voltage applied to the base of a transistor Q6 is sufficiently low to turn transistor Q6 "on," thereby raising the potential applied to the base of transistor Q7, turning transistor Q7 "on" and connecting the PWST output terminal to ground. As capacitor C25 continues to charge, the potential builds upon capacitor C25 to the point where diodes D11 and D12 are cut "off." At this point, transistor Q6 and therefore transistor Q7 are turned "off," forcing the output PWST to go to +5V. When the maintenance or shield jumper is removed, the capacitor C25 rapidly discharges through diode D16 and the relatively low resistance R56.

The multiplexer control circuit 52, as previously discussed with respect to FIGS. 2 and 3, now will be explained in greater detail with regard to FIG. 9. The multiplexer control circuit 52 includes a multiplexer enable circuit 54 for selectively controlling the holding current of the driver SCR's 20, 22 and 24, as shown in FIG. 2A. The interrupting of the holding current is performed by the Q1 and Q2 transistors. In particular, transistor Q1 controls the holding current for the row driver SCR's 20, whereas transistor Q2 controls the holding current for the column driver SCR's 24 as well as the holding current for the bus relays driver SCR 22, as shown in FIG. 2A. With regard to FIG. 9, a transistor Q3 is connected to the bases of transistors Q1 and Q2. Normally, transistor Q3 is biased by the resistors R41, R42 and R43 to its non-conducting state, whereby the potential applied to the bases of transistors Q1 and Q2 is high enough to render the transistors Q1 and Q2 conductive. Upon application of a MEC reset pulse to a NAND gate 74, a positive pulse of similar duration is applied to the base of transistor Q3, thereby turning it "on," rendering transistors Q1 and Q2 non-conductive, and interrupting the holding current of all of the conducting SCR's. The SCR's now are primed to receive the row and column address signals to access the next analog data point. When the maintenance module 16' is inserted into the data acquisition system, a jumper designated MAINT is inserted between the contacts 91 and 92, thereby to connect the bases of transistors Q1 and Q2 to ground in order to keep transistors Q1 and Q2 in their "off" state. Significantly, the MAINT jumper ensures that the transistors Q1 and Q2 may not be turned "on" and that their corresponding SCR drivers 20 and 24 may not be turned "on" to access data from a new point.

As shown in FIG. 9, the multiplexer control circuit 52 also includes the multiplexer selection circuit 56 for generating a false signal which is applied to the register control logic circuit as described above with regard to FIG. 7, to set all 1 signals into the register 44. The emitter of the transistor Q2 is connected to a voltage comparison circuit 76 whose reference potential is developed by a dividing circuit comprised of resistors R48 and R47. Illustratively, the reference voltage VR is set at one-and-a-half times the normal voltage drop across the resistor R1 if only one exciting relay coil is energized. The voltage V1 developed across the resistor R1 is directly proportional to the current circulating through the column conductors and transistor Q2. If more than one relay exciting coil is energized, the current passing through transistor Q2 increases and the voltage V1 goes above the threshold VR with the result that the comparator circuit 76 changes state. As seen in FIG. 9, the output of the comparator circuit 76 is applied to a latch 78 which is set when the comparator circuit 76 changes state. Every time a new point is selected, the $\overline{\text{ONP}}$ pulse resets the latch to its initial condition. When more than one relay exciting coil is energized, the multiplexer selection circuit 76 generates a $\overline{\text{FAULT}}$ signal which is inverted and is applied to the register control logic circuit 42 to force all 1's into the register 44. The ALL 1's signal is recognized by the utilization device as an invalid condition. Further, the $\overline{\text{FAULT}}$ signal is applied to the NAND gate 74 to generate a positive going pulse to turn "on" transistor Q3 and to turn "off" transistors Q1 and Q2, thereby interrupting the holding current of all of the conducting SCR's 20, 22, and 24, and resetting the relay devices.

With regard to FIG. 10, there is shown an automatic restart circuit 90 for ensuring that the FLAG signal generated by the V/C and MEC control logic circuit 34 is set high to indicate to the utilization device that the data acquisition system is in a condition to receive analog data from the next point. In the course of system operation, spurious signals may be generated and applied to the V/C and MEC control logic circuit 34 and in particular the JK flip-flop 60, to disable the raising of the FLAG signal. For example, a spurious $\overline{\text{ONP}}$ or CARRY signal would reset the flip-flop 60 and prevent the raising of the FLAG signal. Under such circumstances, it is desirable to provide means for automatically ensuring that the FLAG signal will be set high in order to restart the process of acquiring new data and of transmitting the acquired data to the utilization device. In particular, the automatic reset circuit 90 is connected to one input of the NAND gate 61 shown in FIG. 5, and ensures that if an $\overline{\text{ONP}}$ signal is not received within a given period of time, the automatic restart circuit 90 will cause the FLAG signal to be raised. It is understood that the utilization device would not apply an $\overline{\text{ONP}}$ signal to the data acquisition system if the data acquisition system had not generated previously a high FLAG signal. It is noted that periodic signals other than the ONP, such as the BOC and EOC signals, could be applied to the restart circuit 90. With regard to FIG. 10, the $\overline{\text{ONP}}$ signal is applied through a NAND gate 80 to reset a retriggerable, one-shot multivibrator circuit 82. Basically, the circuit 82 operates to generate at its *b* output terminal a positive-going signal if not reset within a given period of time. During the normal operation, an $\overline{\text{ONP}}$ signal is applied regularly to the circuit 82 so that no output is derived from its *b* terminal. However, if the V/C and MEC control logic circuit 34 fails to generate a FLAG signal within a given duration of time determined by the circuit 82, a positive going pulse will be generated by the circuit 82 at its *b* output to be applied to the NAND gate 61 of FIG. 5. The positive-going pulse 61 will force the FLAG signal low, providing the desired indication to the utilization device that the analog data acquisition system is ready to receive data from the next point. The output from the *a* output terminal of the circuit 82 is applied to NAND gates 84 and 86 which impose a delay upon the output signal to be applied to the NAND gate 80. Thus, if the first restart signal developed by the circuit 82 is not effective to set the FLAG signal high, the circuit 82 again will be reset after an appropriate delay to generate a second restart signal. Thus, in the absence of an $\overline{\text{ONP}}$ signal, the retriggerable, one-shot multivibrator circuit 82 will continue to generate restart signals until the utilization device responds to the FLAG signal.

Thus, there has been disclosed a self-contained, low-cost data acquisition system which functions with a suitable utilization device such as a computer. Significantly, the organization of the disclosed system is such that the rate of data acquisition is maximized. In particular, the priming of the data acquisition system for acquiring data from the next point is initiated during the processing and, in particular, the integration of data from the first point. Thus, the control of the disclosed data acquisition system is so arranged that the multiplexer, A/D converter and the computer all have sufficient time to function properly without unnecessary delay and overlap. As a result, this system permits more points to be read in a given time. Further, the disclosed system includes many safety features which ensure that no faulty readings are produced. In particular, overrange and multiple selection conditions are recognized and a suitably coded signal such as all 1's is impressed upon the utilization device. A further significant feature of this invention is that the data acquisition system may be calibrated while remaining part of the entire system, including the computer, remains operational without producing faulty readings from the data acquisition system.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed:

1. A system for acquiring analog data from a plurality of data points and for converting the acquired analog data into a digital representation thereof, said system comprising:

a. multiplexing means including a plurality of switching means, each connected to one of the data points for supplying analog data from a selected data point to said system, each of said switching means requiring a predetermined interval of time to open and to close;

b. analog-to-digital conversion means coupled to said multiplexing means for receiving and converting the analog data from a selected point into a corresponding digital representation thereof, said analog-to-digital conversion means including integrator means for performing first and second integration operations upon the analog data derived from the first selected point whereby noise impressed upon the analog data is substantially eliminated; and c. control means responsive to the completion of the first integration operation upon data from a first selected data point for actuating said switching means connected to the first selected data point to open and for initiating the actuation of said switching means connected to a second data point to close while said integrator means performs the second integration operation upon the analog data derived from the first data point, said control means operative after the closing of said switching means connected to the second selected data point and the opening of said switching means connected to the first selected data point, and after the completion of the second integration operation upon the analog data derived from the first data point for permitting the conversion by said conversion means of the data derived from the second data point.

2. The system as claimed in claim 1, wherein said integrator means performs the first integrating operation upon the input analog data for a predetermined interval of time and performs the second integration operation by integrating a reference signal applied thereto until the output of said integrator means reaches a predetermined level, said control means opening after the predetermined interval said switching means connected to the first data point.

3. The system as claimed in claim 2, wherein said analog-to-digital conversion means includes means for generating a train of clock pulses and means for counting the number of pulses generated by said clock means during the second integration operation to provide an indication of the amplitude of the input analog data.

4. The system as claimed in claim 3, wherein said analog-to-digital conversion means includes means for converting the signal indicative of the count of clock pulses into a digital representation applied to a plurality of outputs.

5. The system as claimed in claim 4, wherein there is included over-range detector means responsive to a predetermined combination of signals from the plurality of outputs, to provide a representation that the data handling capacity of said analog-to-digital conversion means has been exceeded.

6. The system as claimed in claim 1, wherein there is included storage means for receiving and storing the digital representation as derived from said analog-to-digital conversion means and, upon command, for transmitting the digital representation to a utilization means, 7. The system as claimed in claim 6, wherein the utilization means applies an interrogation signal to said system, said control means generating a FLAG signal after the deactuation of said switching means connected to the first data point, and control-interface means responsive to the FLAG signal and to the interrogation signal to provide a DATA READY signal to be applied to the utilization means.

8. The system as claimed in claim 7, wherein the utilization means is responsive to the DATA READY signal to generate a READ signal to be applied to said control-interface means to effect transfer of the data stored in said storage means to the utilization means.

9. The system as claimed in claim 1, wherein said plurality of switching means has a first maximum period required to be opened, said control means providing a delay not less than the maximum period from the termination of the first integration operation to the generation of a FLAG signal indicating that said switching means connected to the first data point has been opened.

10. The system as claimed in claim 9, wherein an utilization means applies a command signal to said system to close said switching means connected to the second data point, said control means responsive to the aforementioned command signal for initiating a second delay period corresponding to the maximum time required for said plurality of switching means to be closed, to provide a closure signal indicative of the closing of said switching means associated with the second data point.

11. The system as claimed in claim 10, wherein said control means includes means responsive to the closure signal and to the completion of the analog data conversion by said analog-to-digital conversion means to generate a beginning-of-conversion signal to initiate the conversion of the analog data from the second data point by said analog-to-digital conversion means.

12. The system as claimed in claim 1, wherein said system is adapted to receive either first module means during a normal mode of operation or a second module means during a calibration mode of operation in which said analog-to-digital conversion means is adjusted.

13. The system as claimed in claim 12, wherein said second module means is adapted to be connected to said system to disable said multiplexing means from actuating one of said plurality of switching means.

14. The system as claimed in claim 12, wherein there is included a starting circuit for providing after a predetermined delay period a PWST signal, said control means responsive to the PWST signal to provide a FLAG signal indicating to an utilization means that said system is ready to receive data from another data point.

15. The system as claimed in claim 14, wherein said starting circuit is responsive to the insertion of either of said first and second module means to provide after the predetermined delay the PWST signal.

16. The system as claimed in claim 1, wherein there is further included storage means for receiving and storing the digital representation of the analog data from a single data point and for transmitting the digital representation to an utilization means, said analog-to-digital conversion means generating an end-of-conversion signal indicative that the data from the first data point has been processed, the utilization means providing an output new point signal to said multiplexing means to initiate the closing of said switching means associated with the second data point, said control means responsive to the occurrence of both the output new point signal and the end-of-conversion signal to generate and apply a beginning-of-conversion of the analog data derived from the second data point, said storage means being responsive to the beginning-of-conversion signal for transmitting the stored digital representation to the utilization means.

17. The system as claimed in claim 16, wherein said system is adapted to receive either a first module during the normal operation or a second module for calibration of said analog-to-digital conversion means, said control means responsive to the insertion of said second module to disable said multiplexing means from actuating one of said plurality of switching means and from applying the end-of-conversion signals to said storage means to transmit digital representations therefrom.

18. The system as claimed in claim 16, wherein there is further included starting circuit means responsive to either the insertion of one of said first and second modules or the application of power, for generating a PWST signal for imposing upon said storage means a coded signal indicative thereof.

19. The system as claimed in claim 1, wherein there is included fault detection means responsive to the actuation of more than one of said plurality of switching means for generating a coded signal indicative thereof.

20. The system as claimed in claim 1, wherein an utilization device provides an output new point signal to said system to initiate the actuation of one of said plurality of switching means, said control means including an automatic restart means for generating in the absence of the output new point signal for a predetermined interval, a RESTART signal whereby said control means generates a FLAG signal indicating to the utilization means that said system is ready to acquire data from another data point.

21. The system as claimed in claim 1, wherein each of said switching means comprises a mechanical switch.

* * * * *